J. DAVIS.
Car Brake.
No. 67,962.
Patented Aug. 20, 1867.
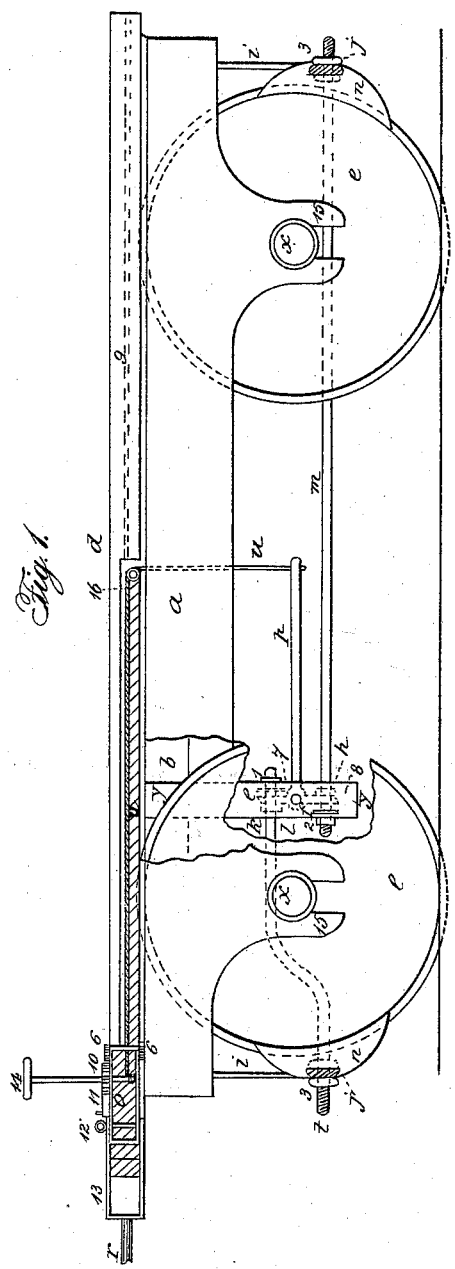
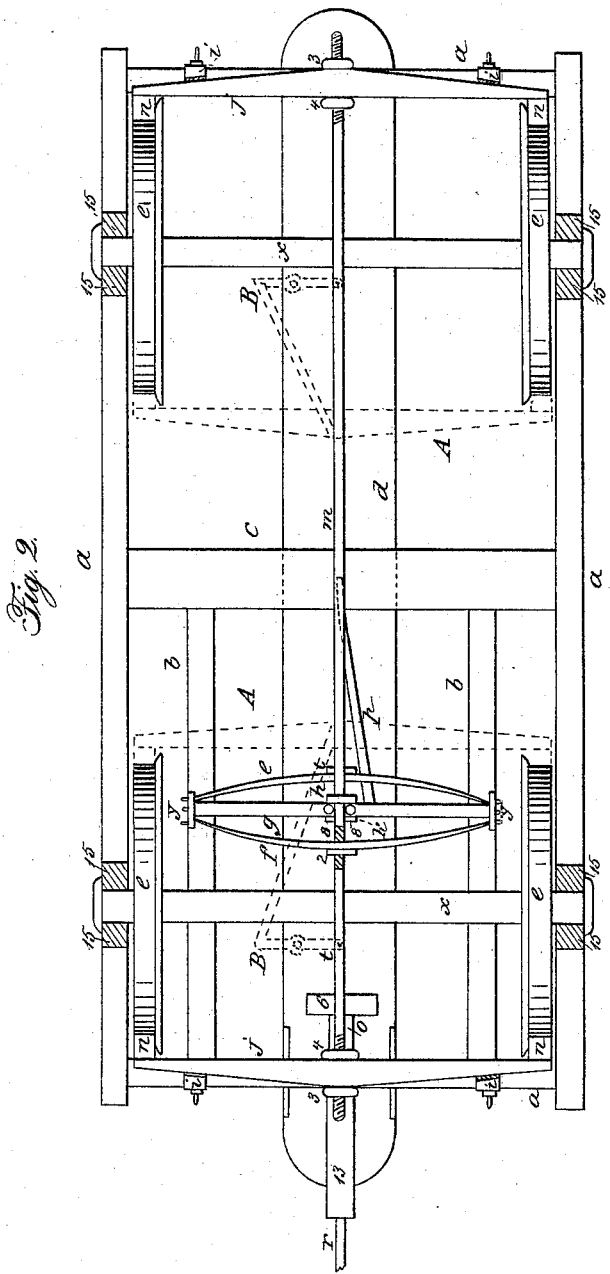
Witnesses:
James J. Johnston
Alexander Hays
Inventor:
John Davis

United States Patent Office

JOHN DAVIS, OF ALLEGHENY CITY, PENNSYLVANIA.

Letters Patent No. 67,962, dated August 20, 1867.

---

IMPROVED CAR-BRAKE.

The Schedule referred to in these Letters Patent and making part of the same.

---

TO ALL WHOM IT MAY CONCERN:

Be it known that I, JOHN DAVIS, of the city and county of Allegheny, and State of Pennsylvania, have invented a new and useful Improvement in "Brakes for Street Cars;" and I do hereby declare that the following is a full and exact description thereof, reference being had to the accompanying drawings and to the letters of reference marked thereon.

My invention consists in a combination of springs, rods, and levers, in combination with brakes of railroad cars. Said springs, rods, levers, and brakes being constructed, arranged, combined, and operating in the manner hereinafter described.

To enable others skilled in the art to make and use my invention, I will proceed to describe its construction and operation. In the accompanying drawings which form part of my specification—

Figure 1 represents a side view of a car truck furnished with my improvement in brakes.

Figure 2 represents an inverted view of the same.

In the drawings, $a$ represents the frame of the car-truck, which is constructed in the ordinary manner. $d$ represents a section of the bottom of the car body. 15 represents the pedestals for the axles $x$ of the wheels $l$. The brake-bars $j$ and brakes $n$ are suspended to the truck by pieces marked $i$. To the brake-bars $j$ is attached one end of the rods $t$ and $m$, the other end of said rods being attached to the springs $e$ and $f$, which are held in the desired position by the hangers marked $y$, which are attached to bars $b$ of the truck-frame $a$. The ends of the rods $t$ and $m$, connected with the springs $e$ and $f$, are provided with fixed collars $h$ and $k$, and screw-nuts 1 and 2; and the ends connected with the brake-bars $j$ are provided with screw-nuts 3 and 4, which are used in connection with the screw-nuts 1 and 2 for regulating and adjusting the rods $t$ and $m$ with relation to the brake-bars $j$ and springs $e$ and $f$, and also for regulating the force and tension of the brakes on the wheels of the car. The shaft $g$, which is placed about midway between the springs $e$ and $f$, and held in position by the hangers $y$, is provided with arms marked 7 and 8, the form of which is clearly shown by dotted lines in fig. 1. To the shaft $g$ is also connected a long arm, $p$, to the end of which is attached a chain, $u$, which passes up and over a pulley, 16, and along a groove in the bottom of the car body, and is attached to the shaft of the hand-lever 14, which is provided with a ratchet-wheel, 10. The shaft of the hand-lever 14 has its bearings in a sliding-frame, $o$, which frame is held in a groove in the bottom or floor $d$ of the car, by means of guides 6 and clevis 13, which is connected to the frame $o$ by a coupling-bolt marked 12. On the frame $o$ is pivoted an ordinary pawl, marked 11, which is used in connection with the ratchet-wheel 10 for holding the brakes off the wheels. The tongue $r$ of the car is attached to the clevis 13. The skillful mechanic will readily see by the dotted lines A B and 9, that the brakes can be duplicated for each truck and car.

As the construction and arrangement of the various parts hereinbefore described will readily be seen and understood by reference to the accompanying drawings, I will therefore proceed at once to describe the operation of my improvement in brakes for street cars or wagons, which operation is as follows:

The horses are suitably attached to the tongue $r$, and the chain $u$ is wound on to the shaft of the head-lever 14 until all the slack of the chain is taken up. Now the draught of horses on the tongue will draw forward the frame $o$ and the parts connected thereto, and this forward movement of the frame $o$ will cause the chain $u$ to raise up the arm $p$, which will bring the arm 7 and 8 of the shaft $g$ against the collars $k$ and $h$, of the rods $t$ and $m$, which will force the rods $t$ and $m$ towards the brake-bars, and also bend the springs, through the medium of said rods, and thereby relieve the wheels $l$ from the pressure of the brakes $n$. Now, if I desire to bring the brakes to bear on the wheels, I cause the horses to back, or I unship the pawl 11 from the ratchet 10. It will be observed that the forward draught of the horses will relieve the wheels from the brakes, and that the backing of the horses will bring the brakes to bear on the wheels. And it will also be observed that by winding the chain $u$ on to the shaft of the hand-lever 14, the brakes will be taken off the wheels, and thus held off through the medium of the pawl 11 and the ratchet 10; and that by simply unshipping the pawl from the ratchet the brakes will be brought to bear on the wheels $l$, through the medium of the rods $t$ and $m$, and springs $e$ and $f$, as hereinbefore described.

Having thus described the nature, construction, and operation of my improvements, what I claim as of my invention, is—

1. The sliding-frame $o$, clevis 13, and pawl 11, when used in combination with the hand-lever 14, provided with ratchet 10, chain $u$, and shaft $g$, provided with arms $p$, 7, and 8, constructed, arranged, combined, and operating in the manner substantially as herein described and for the purpose set forth.

2. The shaft $g$, provided with arms 7, 8, and $p$, when used in combination with the springs $f$ and $e$, rods $t$ and $m$, and brakes $j$, constructed, arranged, combined, and operating in the manner substantially as herein described, and for the purpose set forth.

JOHN DAVIS.

Witnesses:
   JAMES J. JOHNSTON,
   ALEXANDER HAYS.